United States Patent
Hsu

(10) Patent No.: US 6,807,747 B1
(45) Date of Patent: Oct. 26, 2004

(54) STRUCTURE TAPE RULE HOUSING

(76) Inventor: Cheng-Hui Hsu, No. 126, Pao Chung Road, Hsin Tien City, Taipei Hsien (TW)

( * ) Notice: Subject to any disclaimer, the term of this patent is extended or adjusted under 35 U.S.C. 154(b) by 0 days.

(21) Appl. No.: 10/646,790

(22) Filed: Aug. 25, 2003

(51) Int. Cl.⁷ ................................................ G01B 3/10
(52) U.S. Cl. .............................. 33/769; 33/755; 33/760
(58) Field of Search .......................... 33/755, 760–761, 33/768–770, 759

(56) References Cited

U.S. PATENT DOCUMENTS

| | | | | |
|---|---|---|---|---|
| 4,574,486 A | * | 3/1986 | Drechsler | 33/755 |
| 6,148,534 A | * | 11/2000 | Li | 33/769 |
| 6,182,916 B1 | * | 2/2001 | Lin | 33/761 |
| 6,272,765 B1 | * | 8/2001 | Li | 33/769 |
| 6,276,071 B1 | * | 8/2001 | Khachatoorian | 33/761 |
| 6,382,547 B1 | * | 5/2002 | Yang | 33/769 |
| 6,405,451 B1 | * | 6/2002 | Hsu | 33/767 |
| 6,449,866 B1 | * | 9/2002 | Murray | 33/755 |
| 6,484,412 B1 | * | 11/2002 | Donaldson et al. | 33/761 |
| 6,691,426 B1 | * | 2/2004 | Lee et al. | 33/769 |
| 6,718,649 B1 | * | 4/2004 | Critelli et al. | 33/761 |

* cited by examiner

Primary Examiner—G. Bradley Bennett
Assistant Examiner—Yaritza Guadalupe
(74) Attorney, Agent, or Firm—Rosenberg, Klein & Lee

(57) ABSTRACT

An improved structure tape rule housing, the tape rule housing comprised of a left case half and a right case half having a soft rubber pad around their top edges and bottom edges to thereby increase grasping friction and utilization comfort, enabling rule housing variability and greater practical value.

1 Claim, 3 Drawing Sheets

STRUCTURE TAPE RULE HOUSING

BACKGROUND OF THE INVENTION

1) Field of the Invention

The invention herein relates to measuring instruments, specifically an improved structure tape rule housing that provides a tape rule enclosure, the left and right plastic case halves of which have a soft rubber pad around their top edges and bottom edges to thereby increase grasping friction and utilization comfort, enabling additional tape rule housing variability and greater manufacturing practical value.

2) Description of the Prior Art

The outer housing of a conventional tape rule is comprised of a left case half and a right case half that are assembled together. The said conventional tape rule has a measuring blade rolled up inside and since the conventional tape rule consists of a single plastic injected left case half and right case half that are assembled together, grasping friction is deficient and slippage easily occurs and, furthermore, the ordinary plastic housing does not provide for product structure variability. However, to enable greater tape rule utilization convenience, the applicant of the invention herein conducted extensive research and development based on many years of specialized production experience to ensure that the present invention is of superior practical value which, following repeated testing and refinement, culminated in the improved structure tape rule of the invention herein.

SUMMARY OF THE INVENTION

The primary objective of the invention herein is to provide an improved structure tape rule housing, the said tape rule housing comprised of a left case half and a right case half having a soft rubber pad disposed by a second injection molding step around their top edges and bottom edges and, furthermore, wherein the outer periphery of the said rubber pad consists of a plurality of evenly arrayed rib elements, thereby increasing tape rule grasping friction and utilization comfort, while providing for additional tape rule housing variability and higher practicality.

To enable the examination committee a further understanding of the structural features and original content of the present invention as well as its advantages and other related aspects, the brief description of the drawings below are followed by the detailed description of the invention herein.

DETAILED DESCRIPTION OF THE INVENTION

Figure 1:
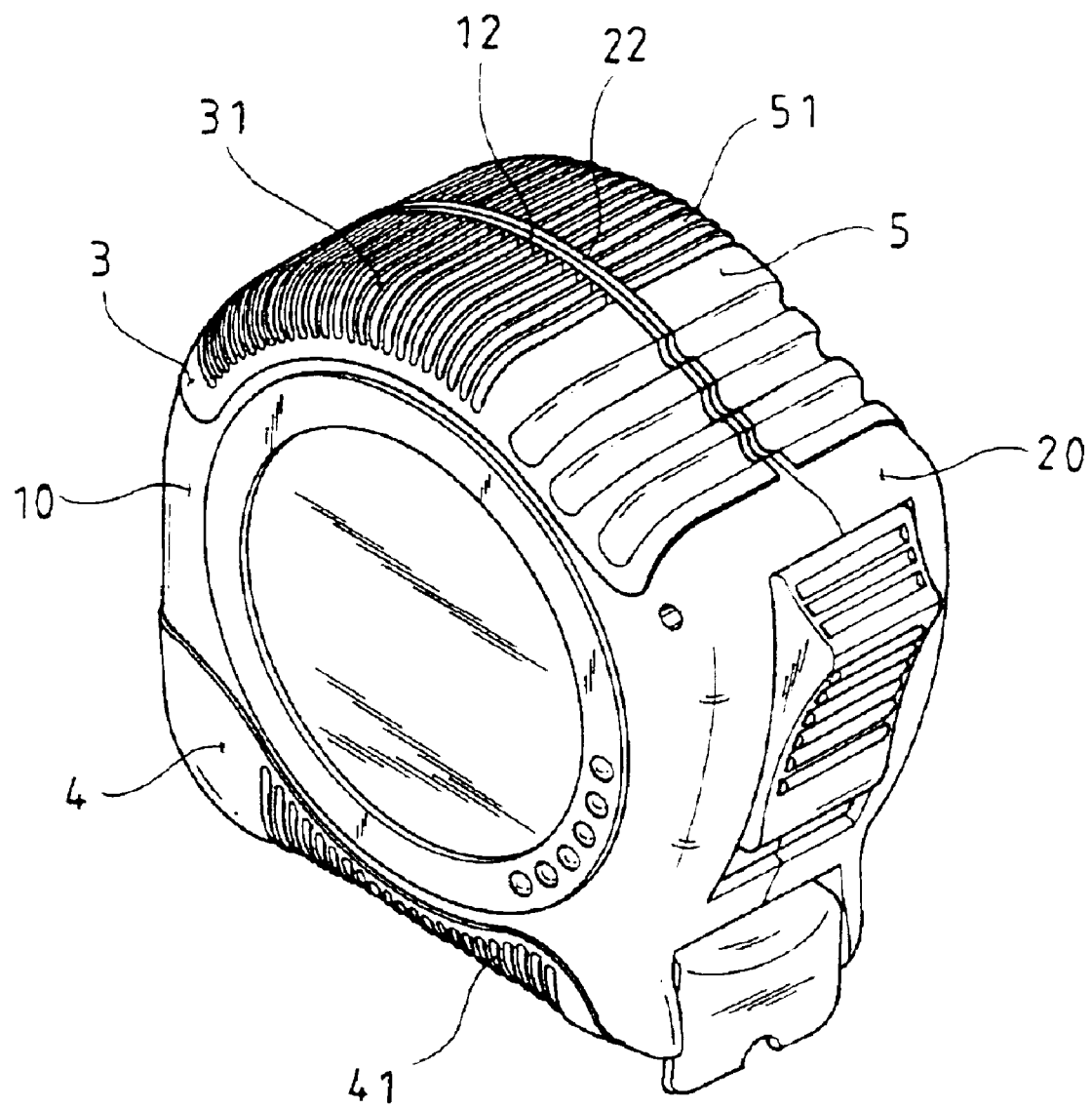
FIG. 1 is an isometric drawing of the invention herein.
Figure 2:
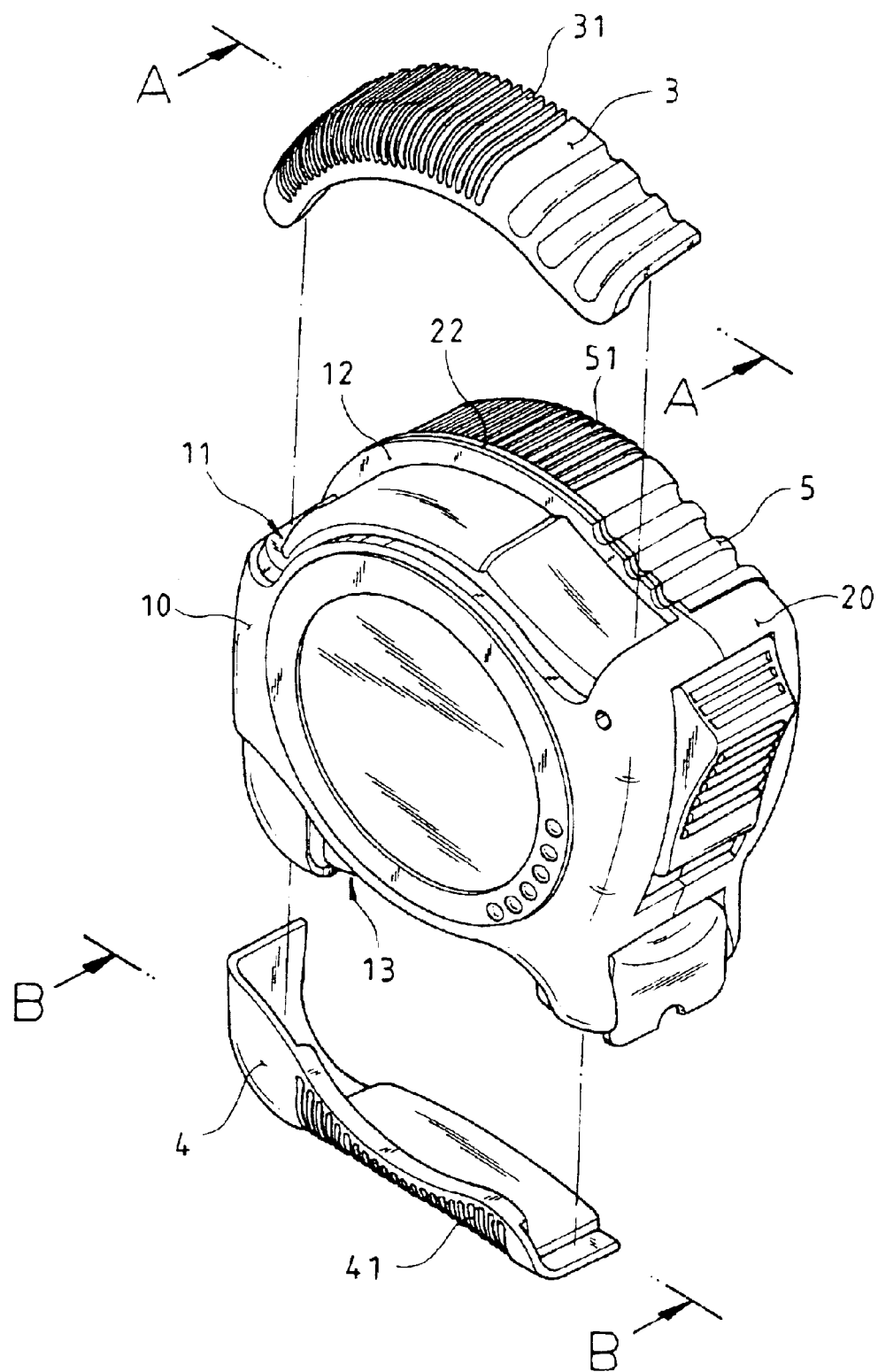
FIG. 2 is an exploded drawing of the invention herein.
Figure 3:
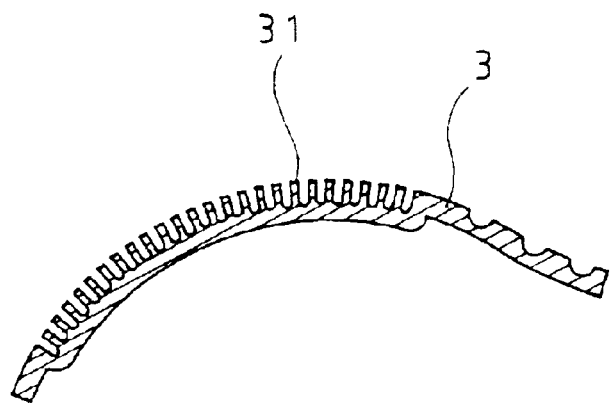
FIG. 3 is a cross-sectional drawing of the rubber pad 3, as viewed from the perspective of line A—A.
Figure 4:
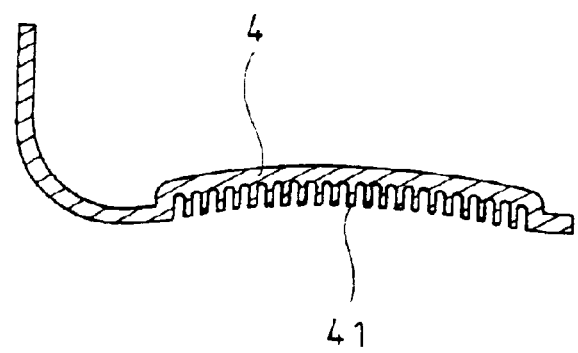
FIG. 4 is a cross-sectional drawing of the rubber pad 4, as viewed from the perspective of line B—B.

Referring to FIG. 1, FIG. 2, FIG. 3, and FIG. 4, in the improved structure tape rule housing of the invention herein, the said tape rule housing is comprised of a left case half 10 and a right case half 20, in which:

The left case half 10 is constructed of a plastic material and after the first injection molding, the said left case half 10 has a recess 11 in its upper edge and, furthermore, an upward extending partition plate 12 along the inner side and center of the recess 11, and the said left case half 10 has a recess 13 in its lower edge; with the upper edge recess 11 and the lower edge recess 13 now present in the left case half 10, a soft rubber material is used for the second injection molding, wherein a rubber pad 3 is formed around the upper edge recess 11 of the left case half 10 and a rubber pad 4 is formed around the lower edge recess 13 of the left case half 10, the outer periphery of the said rubber pad 3 consisting of a plurality of evenly arrayed rib elements 31 and the outer periphery of the rubber pad 4 consisting of a plurality of evenly arrayed rib elements 41.

The right case half 20 is of a reverse symmetrical arrangement, with the right case half 20 having a rubber pad 5 around its upper edge and a rubber pad (not shown in the drawings) around its lower edge.

The left case half 10 and the right case half 20 of the invention herein are assembled by interconnection, the case half upper edge and lower edge each have the soft rubber pad and, furthermore, the outer periphery of the rubber pads consist of a plurality of evenly arrayed rib elements that increase tape rule grasping friction and utilization comfort, enabling additional tape rule housing variability and higher practicality.

The above disclosure is provided to present one feasible embodiment of the invention herein, however, the said embodiment shall not be construed as a limitation of the scope of the invention herein and, furthermore, all equivalent adaptations and modifications of the technological spirit of the invention herein shall remain included within the patented claims of the present invention.

In summation of the foregoing section, since the invention herein is not only of an original spatial arrangement, but also capable of greater utility, performance, and practical value and, furthermore, an identical or similar product has not been observed or disclosed in the market, the invention herein is submitted to the examination committee for review and granting of the commensurate patent rights.

What is claimed is:

1. An improved tape rule housing comprising:

a pair of case halves coupled together at respective inner sides of said case halves, each case half being formed of a plastic material and having a first recess on an upper portion thereof and a second recess on a lower portion of said case half, said first recess extending from an outer side of said case half to an upwardly extending partition plate disposed adjacent said inner side of said case half, said upwardly extending partition plates of said pair of case halves being disposed in juxtaposition;

a pair of first pads respectively disposed in said first recesses of said pair of case halves, each of said first pads being formed of a rubber material and having a plurality of ribs extending from an outer surface thereof; and, a pair of second pads respectively disposed in said second recesses of said pair of case halves, each of said second pads being formed of a rubber material and having a plurality of ribs extending from an outer surface thereof.

* * * * *